United States Patent [19]

Bauer

[11] Patent Number: 4,471,804
[45] Date of Patent: Sep. 18, 1984

[54] BLADE VALVES FOR COMPRESSORS

[75] Inventor: Friedrich Bauer, Vienna, Austria

[73] Assignee: Enfo Grundlagenforschungs AG, Döttingen, Switzerland

[21] Appl. No.: 376,661

[22] Filed: May 10, 1982

[30] Foreign Application Priority Data

May 12, 1981 [AT] Austria ................................. 2111/81

[51] Int. Cl.³ .............................................. F16K 15/14
[52] U.S. Cl. ................................... 137/493.8; 137/851
[58] Field of Search .................. 137/493.8, 851, 454.4, 137/516.11, 512.1

[56] References Cited

U.S. PATENT DOCUMENTS

| | | | |
|---|---|---|---|
| 1,341,145 | 5/1920 | Me er | 137/851 X |
| 1,916,685 | 7/1933 | Saharoff | 137/454.4 |
| 3,926,214 | 12/1975 | Hrabal | 137/851 |
| 4,168,722 | 9/1979 | Mayer et al. | 137/516.11 |

FOREIGN PATENT DOCUMENTS 221164 9/1924 United Kingdom ............. 137/512.1

Primary Examiner—Martin P. Schwadron
Assistant Examiner—Stephen M. Hepperle
Attorney, Agent, or Firm—Watson, Cole, Grindle & Watson

[57] ABSTRACT

A blade valve for a compressor comprises two discs which are arranged one above the other with the interposition of a seal. The discs are provided with ducts for the controlled medium and form both the valve seat and the catcher. In the seal, whose thickness determines the valve stroke, elongate recesses are provided for the blades which control the passage ducts. At the ends of the recesses, stepped stops are provided in the seal for the ends of the strip-like blades which are loosely inserted into the recesses. The stepped stops may be formed by profiled strips which are inserted at the ends of the recesses and which extend transversely to the longitudinal direction of the blades.

7 Claims, 7 Drawing Figures

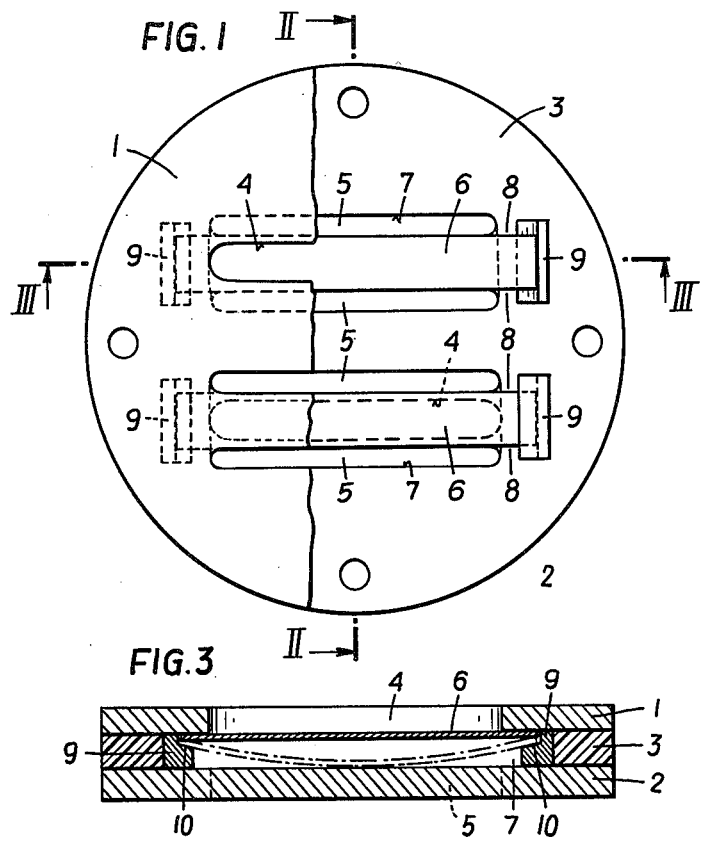
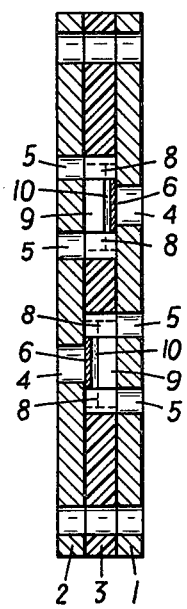
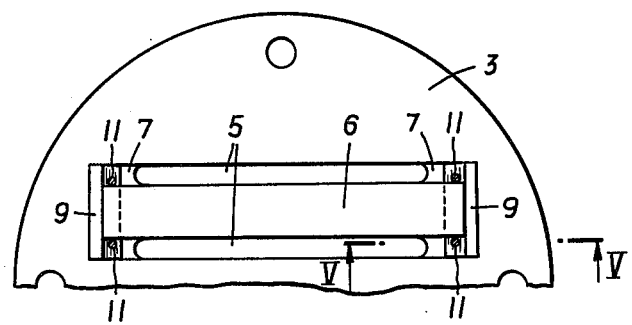
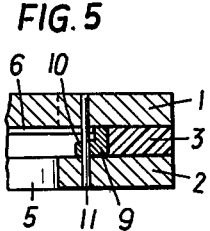
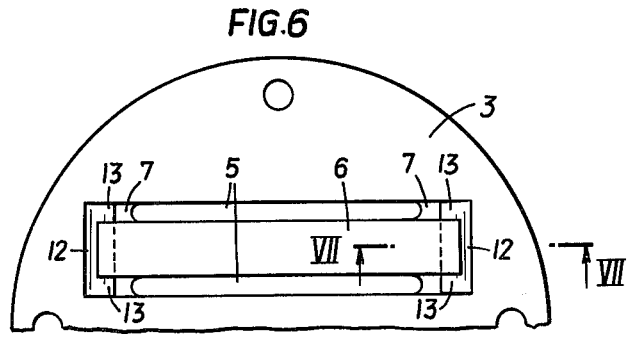
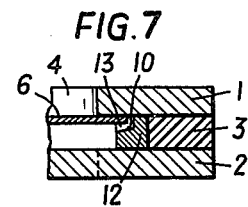

BLADE VALVES FOR COMPRESSORS

The invention relates to a blade valve, for instance for a compressor, of the type comprising two discs which are disposed one above the other with the interposition of a seal, are provided with passage ducts for the controlled medium and form both the valve seat and the catcher, elongate recesses for the blades which control the passage ducts being provided in the seal whose thickness determines the valve stroke.

A blade valve of this type of construction is known from Austrian Pat. No. 287,903, wherein a valve assembly is described which consists of a suction valve and a pressure valve and is composed of two discs with a seal clamped in between the discs, in which seal recesses are provided for the blades. The blades have one end clamped in between the seal and one of the discs and perform the complete stroke movement with their free end. This known type of valve construction is characterized by its simple structure.

The U.S. Pat. No. 1,916,685 discloses valves with blades loosely inserted in recesses. The recesses in this case are provided in the catcher plate and are constructed such that they are cylindrically arched. When the valve opens, the blades bear against the arched stop faces of the recesses under the effect of the flow pressure of the controlled medium. The production of the arched recesses in the catcher plate is expensive and complicated. In addition it may arise, in particular with lubricated valves, that the blades adhere to the arched stop faces when the valve is open and are detached late by the flow forces, which may lead to disadvantageous delayed closures of the valves.

According to the invention, there is provided a blade valve comprising two discs which are arranged one above the other with the interposition of a seal, the discs being provided with passage ducts for a controlled medium and forming a valve seat and a catcher, elongate recesses for elongate blades controlling the passage ducts being provided in the seal, the thickness of which determines the valve stroke, stepped stops for the ends of the blades being provided at the ends of the recesses in the seal, the blades being loosely inserted in the recesses.

The blades are not clamped in and may lift off, over their entire length, from the passage ducts of the valve seat when the valve is open such that they release a cross-section of the passage of a corresponding size. The stepped stops give rise to the fact that the blades arch resiliently during the valve stroke movement, as a result of which the impact on the catcher is dampened. Simultaneously delayed closures are avoided since the arched blades only abut with their central section against the catcher and detach themselves from the catcher in good time as a result of their inherent resilience.

The stepped stops may be formed by the disc-shaped seal itself. In a preferred embodiment of the invention, profiled strips are inserted at the ends of the recesses, extend transversely therein and form the stepped stops. These profiled strips may be produced easily and only have to be cut to size to the right length. They are retained in the correct position by the seal which is cut out so as to correspond to their shape.

Alternatively, pins extending in the direction of stroke may be provided at the sides of the stepped stops for lateral guiding of the blades, the pins preferably penetrating or being anchored in the profiled strips. This arrangement provides reliable lateral guidance of the blades.

As a further alternative for the lateral guiding of the blades, shaped parts which extend transversely in the recesses may be provided at the ends of the recesses, the shaped parts surrounding the ends of the blades with lateral guide bars in a U-shaped manner and forming the stepped stops. The shaped parts may, for example, be easily produced as stamped or sintered shaped parts.

The profiled strips or shaped parts may advantageously consist of plastics materials. The blade valve may be constructed as a single valve and it may comprise a single blade or a plurality of blades. However, it is also possible to combine blade valves as a suction valve and a pressure valve to form a combined valve assembly.

The invention will be further described, by way of example, with reference to the accompanying drawings, in which:

FIG. 1 is a plan view of a valve constituting a preferred embodiment of the invention with parts cut away;

FIG. 2 shows a section on the line II—II of FIG. 1;

FIG. 3 shows a section on the line III—III of FIG. 1;

FIG. 4 is a plan view of another preferred embodiment of the invention;

FIG. 5 is a section through a detail on the line V—V of FIG. 4;

FIG. 6 is a plan view of a further preferred embodiment of the invention; and

FIG. 7 is a section through a detail on the line VII—VII of FIG. 6.

The valve illustrated in FIGS. 1 to 3 comprises two discs 1 and 2 which are disposed one above the other with the interposition of a disc-shaped seal 3. The disc 1 and 2 are provided with passage ducts 4 and 5 for the controlled medium. The passage ducts designated 4 constitute seat ducts, each of which is controlled by a resilient blade 6. As shown in the drawings, this is a valve assembly which comprises two valves, one of which forms the pressure valve and the other of which forms the suction valve. The two discs 1 and 2 each act as the valve seat of one valve and as the catcher of the other.

The strip-like blades 6 are inserted in elongate recesses 7 which are provided in the disc-shaped seal 3. As shown in FIG. 1, guide bars 8, formed by the seal 3, project into the recesses 7 in the region of the ends of the blades 6, against which bars 8 the blades 6 bear and are moved laterally during the stroke movement. In addition, profiled strips 9, which extend transversely to the recesses 7, are provided at the ends of the recesses 7, are offset and form stepped stops 10 for the ends of the blades 6, as shown in FIG. 3.

The controlled medium passes through the passage duct 4 into the valve and lifts the blade 6 from the passage duct 4 as soon as there is a sufficient difference in pressure. The blade 6 is initially displaced in a parallel manner until the ends thereof strike against the stops 10 of the profiled strips 9. Subsequently the blade 6, under the influence of the flow forces of the controlled medium, arches until its central section strikes against the end stop, as is shown in chain-dotted lines in FIG. 3. In the valve shown in FIG. 3, the disc 1 forms the valve seat and the disc 2 forms the catcher. With the blade 6 raised from the valve seat in this manner the controlled medium may flow out of the passage duct 4 past both sides of the blade 6 into the two passage ducts 5 and leave the valve through the latter. As soon as the flow ceases the blade 6 returns to its rest position on the valve seat, the closing movement being induced by the inherent resilience of the blade 6. Since only the central section of the blade 6 bears against the stroke limiter, it does not adhere to the stop face of the catcher when the valves are lubricated, so that disadvantageously delayed closures do not occur.

The valve shown in FIGS. 4 and 5 differs from the embodiment shown in FIGS. 1 to 3 in that the recess 7 is formed in a rectangular manner in the disc-shaped seal 3, without the inwardly projecting guide bars 8. In this case, in the region of the blade ends, pins 11 are provided for lateral guiding and extend in the direction of stroke, penetrate the profiled strips 9, as shown in FIG. 5, and are anchored in bores of the discs 1 and 2. The pins 11 are also used to position the profiled strips 9 in this case.

FIGS. 6 and 7 show an embodiment in which shaped parts 12 are inserted in the recess 7, in the region of the ends of the blades 6 of the valve, and in their central part form the stepping stops 10 for the ends of the blades and also surround the ends of the blades 6 in a U-shaped manner with lateral guide bars 13. The shaped parts 12 are also used thereby for the lateral guiding of the blade 6 during the stroke movement. Both the shaped parts 12 of FIGS. 6 and 7 and the profiled strips 9 of FIGS. 4 and 5 may be produced from plastic materials. As shown in FIGS. 5 and 7, the stops 10 may slope obliquely towards the centre of the blade 6. According to a possible modification, the individual valves may also comprise a plurality of blades 6 which are then suitably arranged in a parallel manner adjacent one another in recesses 7 of the seal 3. Preferred valves may not only be used with valve assemblies consisting of suction and pressure valves, but also with single valves having one or more blades.

I claim:

1. A blade valve comprising two discs arranged one above the other with a seal interposed between said discs, said discs having passage ducts for a controlled medium and defining a valve seat and a valve catcher, said seal having elongate recesses with ends which are capable of communicating with said passage ducts, elongate blades having ends for controlling medium through said passage ducts, said blades located within said recesses of said seal such that the thickness of said seal determines the stroke of said elongated blades, and stepped stops for said ends of said blades provided at said ends of said recesses in said seal, said blades being loosely inserted in said recesses of said seal such that said blades can lift off over their entire length from the passage ducts of the valve seat.

2. A blade valve as set forth in claim 1, wherein said stepped stops are formed by profiled strips which extend transversely in said recesses of said seal and which are inserted at said ends of said recesses of said seal.

3. A blade valve as set forth in claim 2, wherein said profiled strips are made of a plastic material.

4. A blade valve as set forth in claim 2, wherein pins for lateral guiding of said blades are provided at sides of said stepped stops and extend in the direction of the valve stroke, said pins penetrating said profiled strips.

5. A blade valve as set forth in claim 2, wherein pins for lateral guiding of said blades are provided at sides of said stepped stops and extend in the direction of the valve stroke, said pins being anchored in said profiled strips.

6. A blade valve as set forth in claim 1, wherein said stepped stops comprise shaped parts which extend transversely of said recesses of said seal, are inserted at said ends of said recesses of said seal, and have lateral guide bars which surround said ends of said blades in a U-shaped manner.

7. A blade valve as set forth in claim 6, wherein said shaped parts are made of a plastic material.

* * * * *